Figure 1:
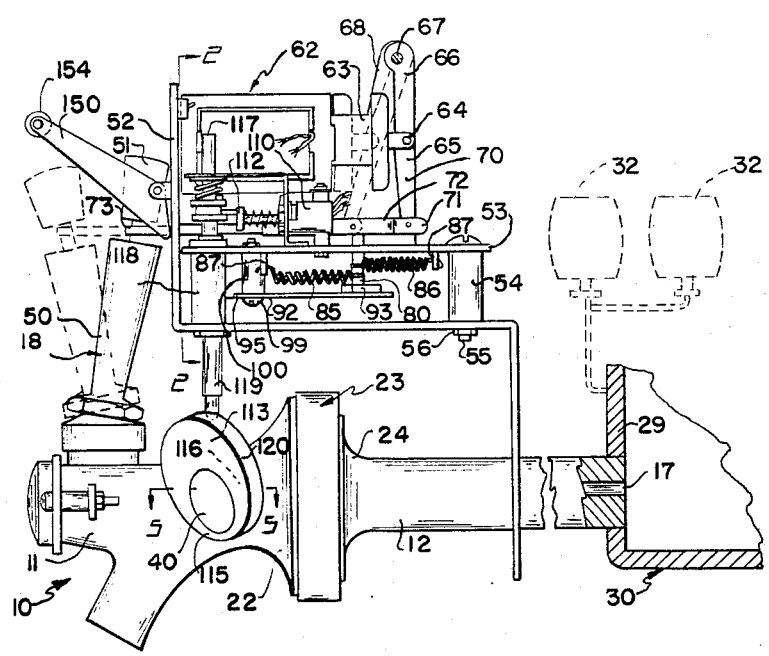

Oct. 29, 1968  L. H. SMITH ET AL  3,408,036

DRAFT BEER METERING APPARATUS

Filed June 6, 1966  3 Sheets-Sheet 1

INVENTORS
LEONARD H. SMITH
WILLIAM A. McMILLAN
BY
Featherstonhaughs Co.
ATTORNEYS Oct. 29, 1968        L. H. SMITH ET AL        3,408,036
DRAFT BEER METERING APPARATUS
Filed June 6, 1966                3 Sheets-Sheet 2
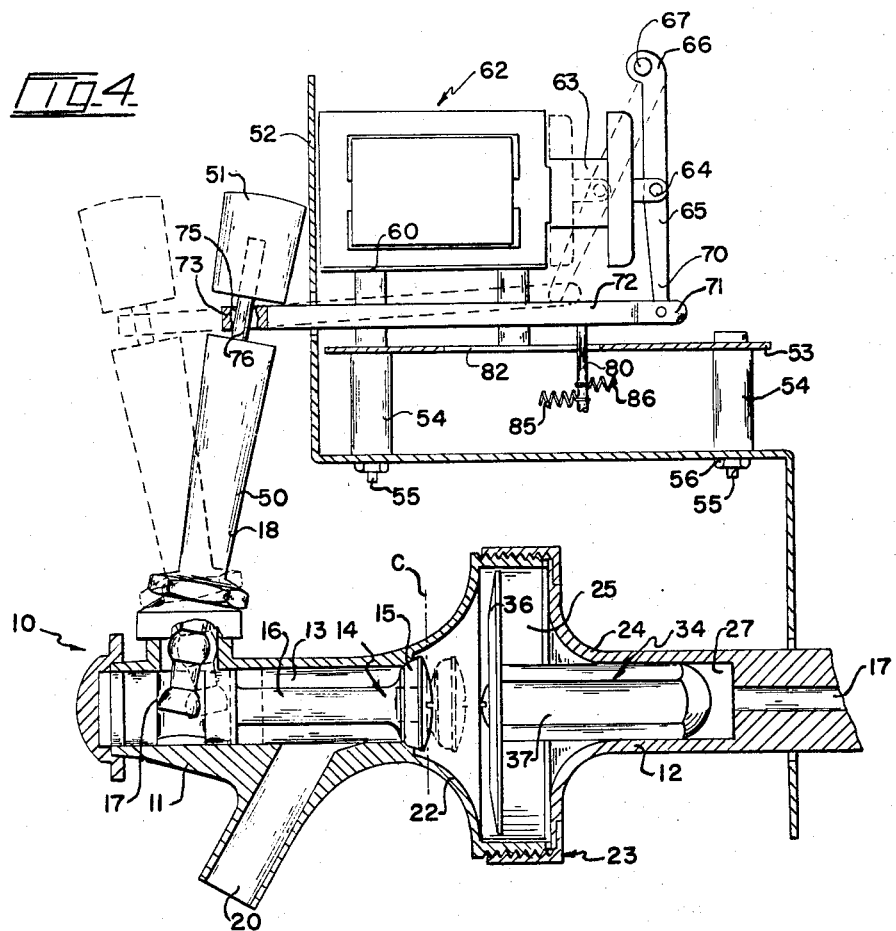
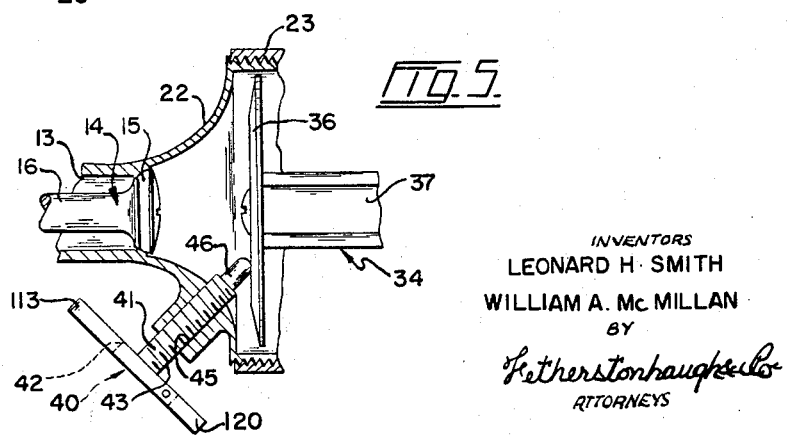
INVENTORS
LEONARD H. SMITH
WILLIAM A. McMILLAN
BY
Fetherstonhaugh & Co
ATTORNEYS INVENTORS
LEONARD H. SMITH
WILLIAM A. McMILLAN
BY
Fetherstonhaugh & Co.
ATTORNEYS United States Patent Office 3,408,036
Patented Oct. 29, 1968

3,408,036
DRAFT BEER METERING APPARATUS
Leonard H. Smith, Vancouver, British Columbia, and William A. McMillan, Delta, British Columbia, Canada, assignors to Electromatic Beer Controls Ltd., Westminster, British Columbia, Canada
Filed June 6, 1966, Ser. No. 555,427
9 Claims. (Cl. 251—138)

This invention relates to apparatus for automatically drawing and metering draft beer.

The drawing of draft beer is an art which requires a high degree of skill on the part of the operator. In beer parlors and the like where patrons demand fast efficient service and a full measure of beer in each glass served, only those operators who are most efficient are able to adequately meet the demand for both speed and accuracy. In order to obtain both speed and accuracy of draw, many and varied types of automatic control apparati have been devised whereby a specific and predetermined volume of beer may be automatically drawn. However, such apparatus has usually been of intricate design and construction which has resulted in frequent break-downs of the equipment and which are not only expensive to install but make the cleaning of beer dispensing apparatus extremely difficult.

The susceptibility of beer to bacterial growth is well known, and all the equipment used, in particular the faucets or taps, must be very thoroughly cleaned at frequent intervals. Throughout the passage of years there has been developed a type of beer faucet in standard usage today which is not only simple to operate but which may be readily disassembled for cleaning. This type of beer faucet has a handle-operated valve operable between fully opened and fully closed positions, the action of the pressurized beer nomally urging the valve to a closed or open position when the latter is placed on one side or the other of a central position. These faucets are also provided with valve means for adjusting the rate of flow of beer when the dispensing valve is in its fully opened position.

It is the prime object of this invention to provide a means to automatically operate the dispensing valve of this type of faucet which, when initiated by the operator, will function to intermittently discharge accurately controlled predetermined amounts of beer and, without in any way changing the internal construction of the faucet so that in the event of a break-down of the apparatus, the faucet may be easily and quickly reconverted to manual operation.

It is a further object of this invention to provide for the automatic dispensing of beer without agitation of the beer so as to avoid the formation of unnecessary foam.

The present apparatus comprises electrically actuated operating means connected to the handle for movement therewith and being adapted when energized to move the valve from a closed to an open position, resilient centering means connected to the operating means normally urging the valve to a centered position adjacent the closed end of travel of the latter, said means being arranged so as to move the valve from its closed position against the action of the beer tending to maintain the valve in its fully open position to said vertical position and being arranged so as to yieldably resist the valve closing action of the beer when the valve reaches said centered position, a circuit for connecting the operating means to a source of power, said circuit being in a normally open condition, a switch in said circuit for closing the latter thereby energizing the operating means so as to move the valve to its open position, and control means in said circuit initiated by closure of the switch for maintaining the circuit in a closed condition for a predetermined period of time.

Figure 2:
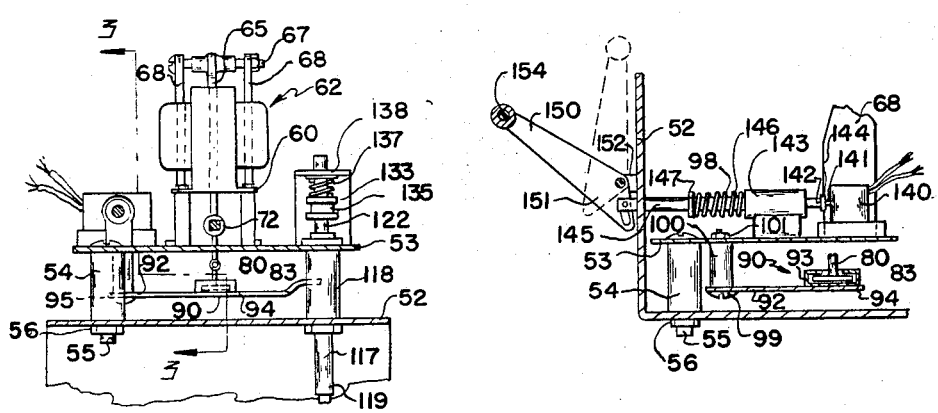
Figure 3:
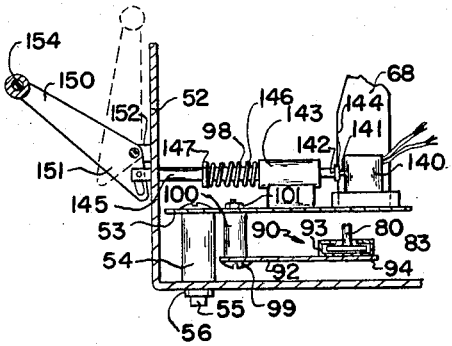
Figure 6:
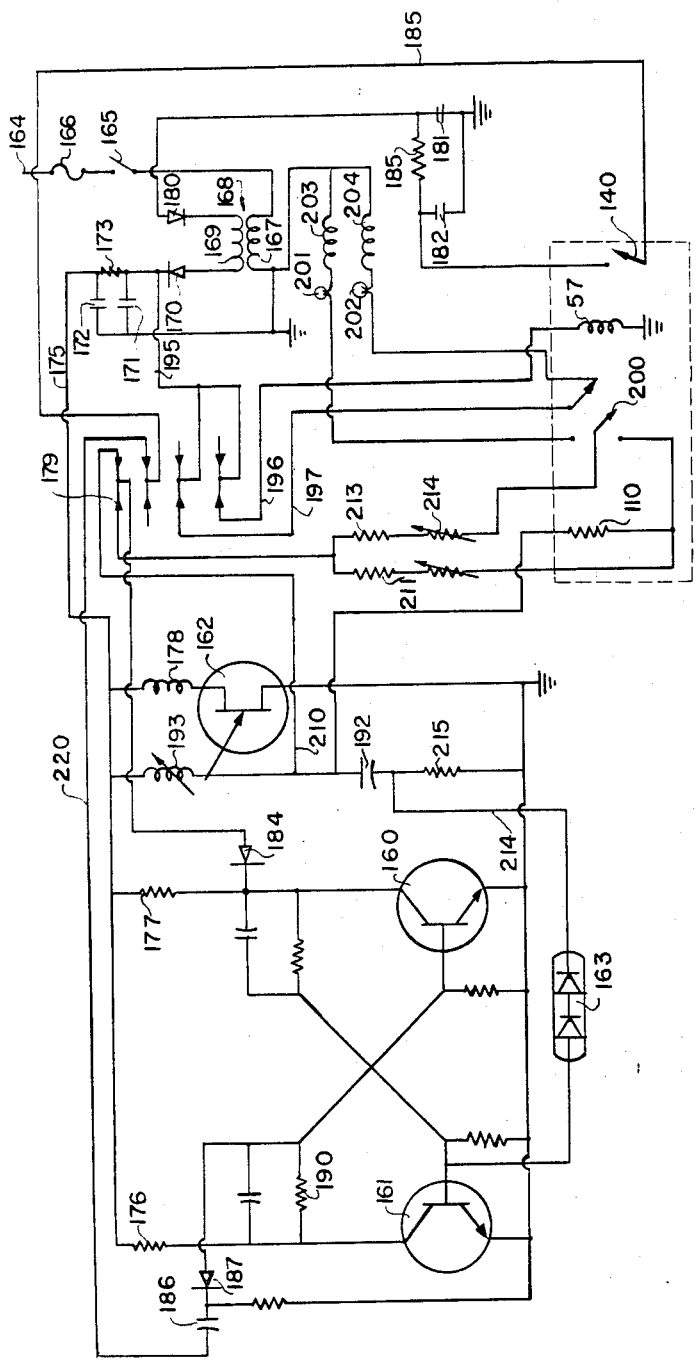

In the drawings which illustrate the invention,

FIGURE 1 is a side view of the invention illustrated in association with a faucet, FIGURE 2 is an end view of the invention in the direction 2—2 of FIGURE 1, FIGURE 3 is another view of a portion of the invention taken on the line 3—3 of FIGURE 2, FIGURE 4 is another side view of the invention in association with a faucet, the latter being illustrated sectionally, FIGURE 5 is a central section of a portion of the faucet of FIGURE 4 taken along lines 5—5 of FIGURE 1, and FIGURE 6 is a diagrammatic illustration of an elecrical control circuit for providing automatic operation of the faucet.

Referring to the drawings and particularly to FIGURES 1 to 5 thereof, there is illustrated a beer faucet 10. This faucet is typical of the type of beer faucet which has been developed and is now in almost universal use.

The faucet 10 is of two-part construction having an outer section 11 and an inner section 12. The outer section has an elongated bore 13 formed therein in which a dispensing valve 14 operates, the dispensing valve has a conically shaped head 15 at one end, a slender stem 16, and is operatively connected at its other end to a lower end 17 of a reciprocating handle 18. The outer section 11 is also provided with an outer bore 20 which intersects the bore 13 in that portion thereof in which the stem 16 of the valve operates and serves as a spout. The walls 22 of the outer section adjacent the head 15 of the valve, are flared outwardly and are joined by a connector 23 to a similarly flared end 24 of the inner section 12 of the faucet, the connection providing an enlarged chamber 25. The inner section 12 which is formed as a pipe having a central bore 17 extends through the walls 29 of a pressure vessel 30 to which barrels of beer 32 are connected.

A flow control valve having an enlarged circular head 36 and a stem 37 is arranged in the chamber 25, the fluted stem 37 slidably extending into a bore 27. The fluted stem permits the passage of beer thereby which escapes around the valve head 36 and into the chamber 25. A valve adjusting member 40 which is in the form of an elongated threaded shaft 41 having a knurled knob 42 at one end 43 threadedly engages the threads of laterally extending tapped holes 45 formed in the walls 22 of the outer section of the tap so that its other end 46 may be adjustably positioned in the path of the head 36 of the flow of control valve 34. This permits the head 36 of the flow control valve to be adjustably positioned relative to the flanged end 24 of the inner section, thereby adjusting the flow of beer into the chamber 25.

The formation of the head 15 of the valve 14 and the flared walls 22 of the outer section are so related that when the valve is moved by the handle 18 to a position slightly in advance of its fully opened position, as shown in dotted lines in FIGURE 4, the flow of beer therebetween tends to urge the valve to its fully opened position. This valve is also so arranged so that when it is positioned slightly in advance of its closed position, as shown in solid lines in FIGURE 4, the pressure of the beer in the chamber tends to move the valve to its closed position.

The tendency of this type of tap to remain in an open position when fully opened, is a feature which permits efficient dispensing of beer by well trained personnel as it permits fast dispensing operation if the tap is allowed to remain in an opened position and beer glasses brought one after the other beneath the spout and consecutively filled. The rate of flow of beer, of course, may be adjusted to suit the capabilities of the tap man operating by means of the valve adjusting member 40.

It is a feature also of this type of tap that the handle 18 is of two-part construction having a lower socket section 50 and an upper handgrip section 51 which is threaded into said lower section 50, being removable therefrom to permit handgrips of various designs to be used. It should also be noted that some beer parlors prefer to use taps or faucets not having the flow control valve, depending upon the skilled tap man entirely.

Manual operation of this type of faucet, where the tap man is skilled, usually does not result in excessive foaming in the beer as the handle may be moved between its fully opened position and fully closed position without slamming, the normal retarding action of the hand as the valve automatically moves to an open or closed position, providing the necessary smoothness of operation. It will be appreciated therefore that any automatic means whereby the handle may be operated from an opened to a closed position must provide the same smoothness of operation otherwise the beer will tend to foam in the pipes and will naturally result in an improperly filled glass of beer.

Referring particularly to FIGURES 1, 2, 3 and 4 which illustrate a preferred mode of assembly of the beer metering apparatus of this invention, the faucet is illustrated as extending from a portion of the counter covering 52 with which most bars are provided. Mounted inside the cover is a platform or base 53 being spaced upwardly therefrom on cylindrical spacers 54 through which bolts 55 are passed and secured by nuts 56. A supporting bracket 60 is mounted on the base in spaced relationship thereto and, mounted on the support bracket, is a solenoid 62 and its horizontally movable plunger 63. The plunger 63 is pivotally connected as at 64 intermediate the ends of a vertical lever 65, the upper end 66 of the lever being swingably mounted on a horizontal shaft 67, the latter extending between a pair of spaced vertical supports 68 which are themselves mounted on the base 53.

The lower end 70 of the lever 65 is pivotally secured to one end 71 of a horizontal elongated rod 72 which passes through a suitably formed aperture in the counter cover 52. The other end 73 is formed having an aperture 75 through which a machine bolt 76 is passed and threaded into the lower socket section 50 of the handle, the upper handgrip section 52 having been previously removed. The operation of the plunger is such that when the solenoid 62 is energized by a current flow of electrical current, it will move the operating handle 18 into a valve opened position, as shown in FIGURE 1 and FIGURE 5.

To the rod 72 is secured one end of an elongated pin 80. This pin depends vertically from the rod 72 through a longitudinally extending slot 82 formed in the platform 53, and has an enlarged button 83 formed at its lower end. A pair of coil tension springs 85 and 86 are each connected to the pin 80 at one of their ends and extended under tension in opposite directions parallel to the rod 72, their other ends being engaged in projecting pieces 87 forced downwardly out of the base platform material.

These springs are so arranged in size and tension that under condition of rest, that is, not subject to the action of beer, they will effectively center the dispensing valve 14 in such a position that its head 15 lies just in advance of a valve fully closed position, this position being illustrated by a dotted line marked C so that movement of the valve out of this position in either direction will be resisted by the action of the springs. This position C of the valve is such, that as has hereinbefore been described, it will automatically move to a fully closed position under the pressure of the beer acting thereagainst. The spring 86 is one chosen which has insufficient strength to overcome the tendency of the valve to close from position C. The spring 85 is chosen so that its strength is insufficient to prevent the operation of the solenoid in moving the handle to a fully opened position, but is sufficient to return the rod 72 and with it the dispensing valve to the aforesaid centered position C. The spring 86 may therefore be considered as a return spring. It will be seen therefore that the action of the springs 85 and 86 is such as to resist, from the centered position C, movement of the dispensing valve 14 to either the fully closed or fully opened position, thereby effectively duplicating the action of the tap man's hand in preventing the unwanted slamming of the dispensing valve 14 and handle 18 in the operation of the faucet.

In order to further reduce the tendency of the valve 14 and the handle 18, there is provided a damping device 90. This device comprises a flat elongated strip of metal 92 having a grommet 93 at one end 94 which loosely embraces the button 83, and pivotally mounted at its other end 95 on the shaft of a bolt 98 between the head 99 thereof is a spacer 100 which spaces the strip 92 below the platform 53. The shaft of the bolt 98 extends through the platform and has a nut 101 tightened down thereover. The bolt 98 may be sufficiently tightened so that the head 99 thereof and the spacer 100 frictionally engage the strip to retard its pivotal movement. This will, consequently, retard movement of the rod 92 in either direction and thereby serves to reduce if not eliminate any tendency of the dispensing valve 14 and handle 18 to slam.

The engagement between the button 83 and the grommet 93 is loose to permit a predetermined amount of relative lateral movement therebetween, the movement being sufficient so that when the dispensing valve 14 is moved to a fully closed position, it may then be moved from said fully closed position to the central position without moving the strip 92. This will therefore provide for unimpeded initial movement of the dispensing valve from its closed position.

Mounted on the platform 53 is a small electrical resistor 110 having a rotatable operating crank 112, and the valve adjusting member 40 is provided with a cam 113 which is in the form of a thick disk 114 having an eccentrically located opening 115 into the knurled knob 42 of the valve adjusting member 40 tightly fits, the disk 114 is secured to the knurled knob 42 by means of set screws 116. The resistor 110 and cam 113 are operatively engaged through a vertically arranged plunger 117 slidably extending through a sleeve 118, the latter extending through both the platform 53 and the counter 52 and positioned so that the lower end of the plunger 117 is arranged above the peripheral edge 120 of the cam 113. Adjacent the upper end 122 of the plunger, is secured a thimble 133 having an annular peripheral groove 135 into which the end of the crank 112 slidably extends. A compression spring 137 is located over the plunger 117 between the thimble 135 and a bracket element 138 located thereabove, normally urging the lower end 119 of the plunger 117 to slidably bear against the peripheral edge 120 of the cam 113. The resistor 110 and cam 113 are so arranged that when the valve adjusting member 40 is rotated so as to move inwardly against the flow control valve thereby reducing the flow of beer, the resistor 110 will be operated to increase the resistance thereof in a circuit with which it is associated, as hereinafter to be explained. It will be noted that the foregoing arrangement permits co-operative movement of the cam 113 and resistor 110 through 180° rotation of the former.

Secured to the platform 53 is a trigger switch 140 connected in a circuit as hereinafter to be explained, the operation of which effects the opening of the faucet. This trigger switch is of a type standard in the industry having a pressure responsive operating button 141 which, when pressed, will serve to close a pair of contacts with which the trigger switch is provided. The button is operated by means of switch operating plunger 142 slidably embraced by a sleeve 143, the latter being secured to the platform 53 so that one end 144 of the plunger is adjacent the button and the other end 145 extends through the counter 52. A compression spring 146 is located over the plunger between the sleeve and a plunger flange 147, normally urging the plunger away from the button. An elongated operating lever 150 is pivotally mounted adjacent one end 151 thereof on brackets 152 which may be secured by suitable means to the counter 52, said one end 151 being pivotally connected to the end 145 of the plunger 142, and having at its other end 153 a weighted handle 154. This lever is so arranged so that it may be operated between a switch-on position as shown in solid lines in FIGURE 3, and a switch-off position as shown in dotted lines in this figure. The lever 150 is so weighted by the handle 154 that it will ordinarily maintain the plunger in its switch-on position against the action of the spring 146, and will be maintained in the switch-off position by the action of said compression spring.

The operation of the solenoid 62 whereby the faucet may be opened for a predetermined period of time, is controlled through a one short multi-vibrator circuit with variable recovery. This type of circuit is of standard design and is illustrated schematically in FIGURE 6. It should be noted here that the metering of beer in predetermined quantities is based upon the opening of the faucet for a predetermined period of time. Although during the drawing of beer from the pressure vessel 30, the gas pressure will steadily reduce. However, it has been found that although there will be a consequent reduction in rate of flow of beer, the reduced volume of beer during each successive operation of the faucet as measured by the glass is, for all intents and purposes, immeasurable. It is to be understood therefore that the dispensing of beer by the glass is governed in respect of time rather than in respect of volume.

Referring now to FIGURE 6 wherein elements of the beer metering apparatus already described and mentioned, have been accorded the same numerals. The circuitry includes two NPN transistors 160 and 161, one unijunction transistor 162 and a diffused junction diode 163. Power for the circuitry is obtained through line 164 through a master switch 165 and fuse 166. Line 164 carries a 115 volt 60 cycle alternating current to the primary 167 of a transformer 168. Through the secondary 169 of the transformer and a diode 170, a pulsating positive D.C. current is applied to filter and voltage dropping circuit capacitors 171 and 172, respectively, and a resistor 173. This applies a low D.C. voltage through line 175 for the multi-vibrator bias circuitry through resistors 176 and 177, respectively, and the coil 178 of a relay 179.

Through the secondary 169 of transformer 168, the other half of the A.C. sine wave is utilized through a diode 180 and filter and voltage dropping circuit capacitors 181 and 182, respectively, and a resistor 183 to apply a negative potential to one contact of the trigger switch 140. The mutli-vibrator in its quiescent state has a low voltage flowing through the collector of transistor 160, diode 180 and the relay contacts 179. The unijunction transistor 162 is therefore held in a quiescent state.

When trigger switch 140 is closed, a negative potential is sent through line 185 to relay contacts 179 and through a capacitor 186 and a diode 187 to supply a negative pulse at the base of the transistor 160. This immediately stops transistor 160 from conducting and because of the positive potential supplied to the collector of transistor 161 through resistor 190 and capacitor 191, transistor 161 will start to conduct. As transistor 160 is non-conductive, capacitor 192 will start to charge through variable resistor 193.

At a predetermined point and in a predetermined time governed by the variable resistor 193, the unijunction transistor 27 will trigger and start conducting, thereby energizing relay coil 178 and closing contacts between lines 195 and 196, thereby applying a D.C. voltage to solenoid 57, the energizing of the latter consequently opening the faucet. The operation of the relay also closes contacts between lines 195 and 197 through a multi-pole switch 200 to either of two groups of lights and numerical counters 201 and 202 or 203 and 204 depending upon the position of the switch 200 which in FIGURE 6 is positioned so as to place lights and counters 202 and 204 respectively in circuit.

The period of time in which solenoid 57 is maintained in an energized condition depends upon the time it takes capacitor 192 to discharge. As illustrated in FIGURE 1 and having regard to the position in which switch 200 is placed, the capacitor will discharge via line 210 and relay contacts 179 through resistor 211, variable resistor 212, variable cam resistor 110 and diode 184. Switch 200 may also be positioned so as to place resistor 213 and variable resistor 214 in parallel with resistors 211 and 212, thereby decreasing the total resistance to the current flow from capacitor 192, thereby decreasing the discharged time of the latter. This switch 200 when placed in the latter position will also cut light and counter 202 and 204, respectively, out of the circuit and place lights 201 and 203 therein.

When the unijunction transistor 162 triggers a negative pulse it is generated through line 214 through resistor 215 and diffused junction diode 163 to the base of the transistor 161. This negative pulse stops transistor 161 from conducting and, as there is no further trigger voltage owing to the position of the relay contacts 179, the multi-vibrator will tend to return to its normal or quiescent state after dissipation of the charge in capacitor 192.

If trigger switch 140 is opened at this time or had been operned during the preceding cycle, relay coil 179 will be deenergized, permitting the contacts 179 to reverse, thereby deenergizing solenoid 57, and the counters and lights previously mentioned will stop indicating.

If switch 140 is left closed, then immediately relay contacts 179 reverse line 220 and will carry a negative pulse through capacitor 186 and diode 187 to start the whole cycle over again. The reversal of relay contacts, however, has resulted in the de-energizing of solenoid 57 and the cutting of the lights and counters from the circuit. Therefore, when relay coil 178 is again energized to change the position of the relay contacts 179, solenoid 57 will again be energized to reopen the faucet and, at the same time, place whichever of the lights and counters are selected by the switch 200 in circuit.

It will be appreciated that the operation of switch 200 to either connect or disconnect resistors 213 and 214 in parallel with resistors 211 and 212 will permit instant selection of two predetermined amounts of beer to be drawn, whereby either small or large glasses of beer may be served, the size of glass then filled being indicated by either of the lights 201 or 203 and being recorded by either of the numerical counters 202 or 204. An accurate record of the number of glasses drawn and the size thereof may be kept.

The operation of variable resistor 110 is so correlated to the operation of the valve adjusting member 40 so that when the valve adjusting member is positioned to obtain the rate of flow required, the resistor 110 will automatically move to a position wherein the time period during which the faucet remains open is such that a full measure of beer is drawn regardless of the rate of flow thereof. This permits adjustment of the rate of flow of beer without affecting the total quantity to be drawn each time the faucet is operated.

In practice, the variable resistors 212 and 214 may be located in a position remote from the faucet, preferably in the manager's office to be set by the manager to control the amount of beer per glass, whereas switch 220 would be located at the faucet to be operated by the tap man.

In the operation of the foregoing apparatus, it will be seen that the tap man by momentarily triggering the trigger switch, may draw one glass of beer or by leaving the handle 154 in its down position obtain successive draughts in measured quantities without again touching the handle except to operate the latter during the drawing of the last glass of beer to be drawn. Furthermore, if the metering apparatus should fail either by reason of a power failure or by some failure in the operating mechanism, it may quickly and easily be disconnected from the handle 18 and the latter used manually in the normal fashion. The metering apparatus as above described also requires no changes in the internal construction of the faucet which otherwise would have rendered the latter more difficult to disassemble for cleaning purposes. Furthermore, as the faucet need not be altered with the exception of the replacement of the machine bolts 76 for the handgrip section 52, installation of the metering apparatus may be carried out very quickly and cheaply.

What we claim as our invention is:

1. Beer metering apparatus for controlling the dispensing of pressurized beer from a faucet, the latter having a beer passage, a dispensing valve in the passage reciprocately travelable between open and closed positions, and a handle connected to the valve for supporting the latter, said valve being urged by the action of the beer in the passage to travel to a fully closed position when located adjacent the valve closed end of its travel and to travel to a fully open position when positioned adjacent the valve open end of its travel, comprising electrically actuated opearting means connected to the handle for movement therewith and being adapted when energized to move the valve from a closed to an open position, resilient centering means connected to the operating means normally urging the valve to a centered position adjacent the closed end of travel of the latter, said means being arranged so as to move the valve from its closed position against the action of the beer tending to maintain the valve in its fully open position to said centered position and being arranged so as to yieldably resist the valve closing action of the beer when the valve reaches said centered position, a circuit for connecting the operating means to a source of power, said circuit being in a normally open condition, a switch in said circuit for closing the latter, thereby energizing the operating means so as to move the valve to its open position, and control means in said circuit initiated by closure of the switch for maintaining the circuit in a closed condition for a predetermined period of time.

2. Beer metering apparatus for controlling the dispensing of pressurized beer from a faucet, the latter having a beer passage, a dispensing valve in the passage reciprocately travelable between open and closed positions, and a handle connected to the valve for supporting the latter, said valve being urged by the action of the beer in the passage to travel to a fully closed position when located adjacent the valve closed end of its travel and to travel to a fully open position when positioned adjacent the valve open end of its travel, comprising electrically actuated operating means connected to the handle for movement therewith and being adapted when energized to move the valve from a closed to an open position, resilient centering means connected to the operating means normally urging the valve to a centered position adjacent the closed end of travel of the latter, said means being arranged so as to move the valve from its closed position against the action of the beer tending to maintain the valve in its fully open position to said centered position and being arranged so as to yieldably resist the valve closing action of the beer when the valve reaches said centered position, a circuit for connecting the opening means to a source of power, said circuit being in a normally open condition, a switch in said circuit for closing the latter, thereby energizing the operating means so as to move the valve to its open position, control means in said circuit initiated by closure of the switch for maintaining the circuit in a closed condition for a predetermined period of time, and damping means connected to the operating means for retarding movement thereof.

3. Beer metering apparatus as claimed in claim 2 in which the centering means comprises a pair of counteracting springs.

4. Beer metering apparatus as claimed in claim 2 in which the damping means comprises an arm member operably connected to the operating means for movement therewith, and a brake member slidably engaging said arm member for frictionally retarding movement thereof.

5. Beer metering apparatus for controlling the dispensing of pressurized beer from a faucet, the latter having a beer passage, a dispensing valve in the passage reciprocately travelable between open and closed positions, and a handle connected to the valve for supporting the latter, said valve being urged by the action of the beer in the passage to travel to a fully closed position when located adjacent the valve closed end of its travel and to travel to a fully open position when positioned adjacent the valve open end of its travel, comprising an elongated operating rod operably connectable at one end to the handle for movement therewith, a solenoid having a plunger, said plunger being operably connected to the other end of the rod and being adapted when the solenoid is energized to move the valve from a closed to an open position, a counteracting spring assembly operably connected to the rod normally urging the valve to a centered position adjacent the closed end of travel of said valve, said assembly being arranged so as to move the valve from its closed position against the action of the beer tending to maintain the valve in its fully open position to said centered position and being arranged so as to yieldably resist the valve closing action of the beer when the valve reaches said centered position, a circuit for connecting the operating means to a source of power, said circuit being in a normally open condition, a switch in said circuit for closing the latter, thereby energizing the operating means so as to move the valve to its open position, control means in said circuit initiated by closure of the switch for maintaining the circuit in a closed condition for a predetermined period of time, and damping means connected to the rod for retarding movement thereof.

6. Beer metering apparatus as claimed in claim 5 in which the damping means comprises an arm member operably connected to the rod for movement therewith, and a brake member slidably engaging said arm member for frictionally retarding movement thereof.

7. Beer metering apparatus as claimed in claim 6 in which the connection between the arm member and rod is arranged to provide for a predetermined amount of relative movement therebetween in the direction of movement of said rod, said predetermined amount of relative movement being less than the travel of the rod engendered by movement of the valve from its centered position to its closed position.

8. Beer metering apparatus for controlling the dispensing of pressurized beer from a faucet, the latter having a beer passage, a dispensing valve in the passage reciprocately travelable between open and closed positions, and a handle connected to the valve for supporting the latter, said valve being urged by the action of the beer in the passage to travel to a fully closed position when located adjacent the valve closed end of its travel and to travel to a fully open position when positioned adjacent the valve open end of its travel, a flow control valve in the passage, and a movable member to adjust the position of the flow control valve so as to adjust the rate of flow of beer when the dispensing valve is arranged in a fully open position, comprising electrically actuated operating means connected to the handle for movement therewith and being adapted when energized to move the dispensing valve from a closed to an open position, resilient centering means connected to the operating means normally urging the dispensing valve to a centered position adjacent the closed end of travel of the latter, said means being arranged so as to move the dispensing valve from its closed position against the action of the beer tending to maintain said dispensing valve in its fully open position to said centered position and being arranged so as to yieldably resist the valve closing action of the beer when the dispensing valve reaches said centered position, a circuit for connecting the operating means to a source of power, said circuit being in a normally open condition, a switch in said circuit for closing the latter, thereby energizing the operating means so as to move the dispensing valve to its open position, control means in said circuit initiated by closure of the switch for maintaining the circuit in a closed condition for a predetermined period of time, a variable resistor in the circuit for varying said predetermined period of time, thereby varying the time the faucet remains open to discharge beer, and linkage means operably linking the movable member and the variable resistor, whereby movement of the movable member to alter the position of the flow control valve and thereby alter the rate of flow of beer will result in movement of the variable resistor to alter said predetermined period of time, the movements of the movable member and variable resistor being correlated so as to provide for a constant volumetric discharge of beer for each discharge operation of the faucet.

9. Beer metering apparatus as claimed in claim 8 in which said linkage means comprises a cam member connectable to the movable member for movement therewith, an elongated plunger slidably engaged at one end with the cam member for movement therewith and connected at its other end to the resistor for transmitting movement of the cam member thereto, and resilient means normally urging the plunger into said slidable engagement with the cam member.

References Cited

UNITED STATES PATENTS

| | | | |
|---|---|---|---|
| 2,151,110 | 3/1939 | Hutsell | 222—70 X |
| 2,270,932 | 1/1942 | Cornelius | 251—357 X |
| 3,107,705 | 10/1963 | Isserstedt | 222—70 X |
| 3,210,041 | 10/1965 | Mitts | 251—138 |
| 3,257,033 | 6/1966 | Stott | 222—70 X |
| 3,343,721 | 9/1967 | Paley | 222—70 |
| 3,355,068 | 11/1967 | Harland et al. | 222—70 X |

M. CARY NELSON, *Primary Examiner.*

R. C. MILLER, *Assistant Examiner.*